(12) United States Patent
Sugiyama et al.

(10) Patent No.: US 12,596,133 B2
(45) Date of Patent: Apr. 7, 2026

(54) LIQUID DISPENSING DEVICE

(71) Applicant: Hitachi High-Tech Corporation, Tokyo (JP)

(72) Inventors: Hidetoshi Sugiyama, Tokyo (JP); Shigeki Matsubara, Tokyo (JP); Toshinari Sakurai, Tokyo (JP); Takayuki Obara, Tokyo (JP); Ryosuke Kawachi, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 1110 days.

(21) Appl. No.: 17/630,055

(22) PCT Filed: Feb. 21, 2020

(86) PCT No.: PCT/JP2020/007151
§ 371 (c)(1),
(2) Date: Jan. 25, 2022

(87) PCT Pub. No.: WO2021/024521
PCT Pub. Date: Feb. 11, 2021

(65) Prior Publication Data
US 2022/0276278 A1 Sep. 1, 2022

(30) Foreign Application Priority Data
Aug. 5, 2019 (JP) ................................. 2019-143854

(51) Int. Cl.
*G01N 35/10* (2006.01)
*G01N 35/00* (2006.01)
(52) U.S. Cl.
CPC ..... *G01N 35/1011* (2013.01); *G01N 35/1002* (2013.01); *G01N 35/1016* (2013.01); *G01N 2035/00425* (2013.01)

(58) Field of Classification Search
CPC ........... G01N 35/1011; G01N 35/1002; G01N 35/1016; G01N 2035/00425;
(Continued)

(56) References Cited

U.S. PATENT DOCUMENTS

2004/0034479 A1 2/2004 Shimase et al.
2008/0305012 A1 12/2008 Camenisch
(Continued)

FOREIGN PATENT DOCUMENTS

CN 103777095 A 5/2014
JP 2-135865 U 11/1990
(Continued)

OTHER PUBLICATIONS

Machine Translation of JP 2001-141734 (Year: 2001).*
(Continued)

*Primary Examiner* — Lessanework Seifu
(74) *Attorney, Agent, or Firm* — Crowell & Moring LLP

(57) ABSTRACT

Means for determining whether or not a reagent necessary for a chemical reaction is normally discharged is provided for a liquid dispensing device that dispenses the reagent for the reaction. A liquid dispensing device as such means includes a temperature controller that controls a temperature of a reaction position to any appropriate temperature and a temperature monitor part that monitors the temperature of the reaction position, monitors with the temperature monitor part a change in the temperature of the reaction position when the dispensing device discharges a reagent, and when a temperature change amount deviates from a beforehand determined threshold range, determines abnormal dispensation.

14 Claims, 8 Drawing Sheets

| REAGENT | REAGENT DISPENSING AMOUNT | LIQUID COLD-KEEPING TEMPERATURE | REACTION PART TEMPERATURE |
|---------|---------------------------|--------------------------------|---------------------------|
| A | OOOµl | ΔΔΔ℃ | ▲▲▲℃ |
| B | ×××µl | □□□℃ | ◇◇◇℃ |

(58) Field of Classification Search
CPC .......... G01N 2035/00356; G01N 2035/00376;
G01N 2035/00435; G01N 2035/0097;
G01N 2035/1018
See application file for complete search history.

(56) References Cited

U.S. PATENT DOCUMENTS

| | | | |
|---|---|---|---|
| 2020/0355712 A1* | 11/2020 | Kawamoto ............ | G01N 35/04 |
| 2021/0302457 A1* | 9/2021 | Funakoshi ....... | G01N 35/00663 |

FOREIGN PATENT DOCUMENTS

| | | | |
|---|---|---|---|
| JP | 5-27674 U | 4/1993 | |
| JP | 2001-141734 A | 5/2001 | |
| JP | 2004-125780 A | 4/2004 | |
| JP | 2010-66108 A | 3/2010 | |
| JP | 2011-17608 A | 1/2011 | |
| JP | 2013-185884 A | 9/2013 | |
| JP | 2016-80441 A | 5/2016 | |

OTHER PUBLICATIONS

Extended European Search Report issued in European Application No. 20849242.1 dated Jul. 7, 2023 (8 pages).
Chinese-language Office Action issued in Chinese Application No. 202080052928.8 dated Jan. 26, 2025 (10 pages).
International Search Report (PCT/ISA/210) issued in PCT Application No. PCT/JP2020/007151 dated Apr. 21, 2020 with English translation (five (5) pages).
Japanese-language Written Opinion (PCT/ISA/237) issued in PCT Application No. PCT/JP2020/007151 dated Apr. 21, 2020 (four (4) pages).

\* cited by examiner

| REAGENT | REAGENT DISPENSING AMOUNT | LIQUID COLD-KEEPING TEMPERATURE | REACTION PART TEMPERATURE |
|---------|---------------------------|---------------------------------|---------------------------|
| A | ○○○μl | △△△°C | ▲▲▲°C |
| B | ×××μl | □□□°C | ◇◇◇°C |

FIG. 4

| REAGENT TYPE | REAGENT COLD-KEEPING SETTING TEMPERATURE | REACTION PART SETTING TEMPERATURE | DISPENSING AMOUNT | DETERMINATION TIME | MINIMUM TEMPERATURE THRESHOLD |
|---|---|---|---|---|---|
| A | 10°C | 37°C | 50 μl | 0.5 to 1.0 sec | 35.5 to 36.5°C |
| | | | 100 μl | 1.0 to 2.0 sec | 34.0 to 35.0°C |
| | | | 150 μl | 2.0 to 3.0 sec | 33.0 to 35.0°C |

FIG. 6

| REAGENT TYPE | REAGENT COLD-KEEPING SETTING TEMPERATURE | REACTION PART SETTING TEMPERATURE | DISPENSING AMOUNT | DETERMINATION TIME | ΔT/Δt THRESHOLD (°C/sec) |
|---|---|---|---|---|---|
| B | 10°C | 65°C | 50 μl | 1.0 sec | −3.0 to −4.0 |
| | | | 100 μl | 2.0 sec | −3.0 to −4.0 |
| | | | 150 μl | 3.0 sec | −3.0 to −4.0 |

FIG. 7

| REAGENT TYPE | REAGENT COLD-KEEPING SETTING TEMPERATURE | REACTION PART SETTING TEMPERATURE | DISPENSING AMOUNT | DETERMINATION TEMPERATURE | ON/OFF TIME RATIO THRESHOLD |
|---|---|---|---|---|---|
| C | 5°C | 37°C | 50 μl | AT REACHING 37°C | 0.2 to 0.3 |
| | | | 100 μl | AT REACHING 37°C | 0.3 to 0.4 |
| | | | 150 μl | AT REACHING 37°C | 0.4 to 0.5 |

LIQUID DISPENSING DEVICE

TECHNICAL FIELD

The present invention relates to a liquid dispensing device, specifically a liquid dispensing device using a chemical reaction, such as an automated analyzer, which is used for extracting a sample, a reagent, or a reaction solution of a sample and a reagent.

BACKGROUND ART

While serum or plasma is often used as a sample in a sample test such as a biochemical test or an immune serum test, when such a sample is left for a long time from extraction to the test, a solid such as fibrin (hereinafter, referred to as clot) is generated in the sample. If such a sample is directly flown in an automated analyzer, the clot may clog in a sample probe. If the sample probe is thus clogged, a predetermined amount of sample cannot be dispensed into a reaction container, leading to inaccurate analysis results. This means that analysis reliability of the automated analyzer is severely impaired.

As means for solving such a trouble, provided is a technique, in which a pressure sensor is provided in a dispensing channel including a sample probe, and clogging of the sample probe is detected based on pressure variation. Patent Literature 1 (Japanese Unexamined Patent Application Publication No. 2004-125780) discloses a technique of detecting, by a pressure sensor, clogging caused by a solid such as fibrin in a sample or detecting abnormal sample dispensation due to a bubble in a sample surface.

Patent Literature 2 (Japanese Unexamined Patent Application Publication No. 2011-17608) discloses a technique, as another means, of determining whether or not a liquid surface is normally detected during reagent aspiration based on a change in physical quantity during reagent discharge. It is disclosed that the technique uses capacitance, electric resistance, and transmitted-light quantity as the physical quantity.

CITATION LIST

Patent Literature

Patent Literature 1: Japanese Unexamined Patent Application Publication No. 2004-125780.

Patent Literature 2: Japanese Unexamined Patent Application Publication No. 2011-17608.

SUMMARY OF INVENTION

Technical Problem

For the method of using the pressure sensor in the dispensing channel (see Patent Literature 1), sufficient pressure change is not obtained in a case of low viscosity and low surface tension of a liquid to be aspirated, making it difficult to accurately detect abnormal sample dispensation. Patent Literature 2 describes the technique as means for determining whether or not a liquid surface is normally detected during reagent aspiration, but does not disclose a configuration enabling determination on whether or not a reagent has been normally dispensed and discharged for a chemical reaction.

For a liquid dispensing device that dispenses a liquid (for example, reagent) for a chemical reaction, therefore, it is important to achieve a method for determining whether or not the relevant liquid is normally discharged regardless of viscosity and surface tension of a liquid to be dispensed.

Other problems and novel features will be clarified from the content of this description and the accompanied drawings.

Solution to Problem

Among some embodiments disclosed in this application, a typical embodiment is briefly summarized as follows. The liquid dispensing device according to the typical embodiment includes a temperature controller that controls a temperature of a reaction position in a reaction container and a temperature monitor part that monitors the temperature of the reaction position, monitors with the temperature monitor part a change in temperature of the reaction position when a reagent is discharged into the reaction container, and when a temperature change amount deviates from a beforehand determined threshold range, determines abnormal dispensation.

Advantageous Effects of Invention

According to the typical embodiment, reliability of the liquid dispensing device can be improved. Specifically, abnormal dispensation of the liquid dispensing device can be detected.

BRIEF DESCRIPTION OF DRAWINGS

FIG. 4 is a table showing a minimum temperature threshold for a device state of this embodiment.

FIG. 6 is a table showing a $\Delta T/\Delta t$ threshold for another device state of this embodiment.

FIG. 7 is a table showing an ON/OFF time ratio threshold for another device state of this embodiment.

DESCRIPTION OF EMBODIMENTS

Hereinafter, some embodiments of the invention are described in detail with reference to drawings. In all drawings for explaining the embodiments, components having the same function are designated by the same numeral, and duplicated description is omitted. In the embodiments, the same or similar portion is not repeatedly described in principle except for a particularly required case.

First Embodiment

The following description relates to an operation of aspirating a liquid in a container and discharging the liquid into another container, i.e., relates to a liquid dispensing device used for a dispensation, and is given on improving reliability of the liquid dispensing device by enabling detection of abnormality occurring in a dispensation path (liquid path), for example. Specifically, occurrence of abnormal dispensation is detected using a fact that when the amount of a liquid discharged to the inside (dispensing position) of a container by dispensation is larger or smaller than a desired amount, a change in temperature of the dispensing position deviates from a predetermined range. Although the object to be dispensed may be a sample or a reagent, this embodiment will be described mainly with a case of dispensing a reagent.

Structure of Liquid Dispensing Device

Figure 1:
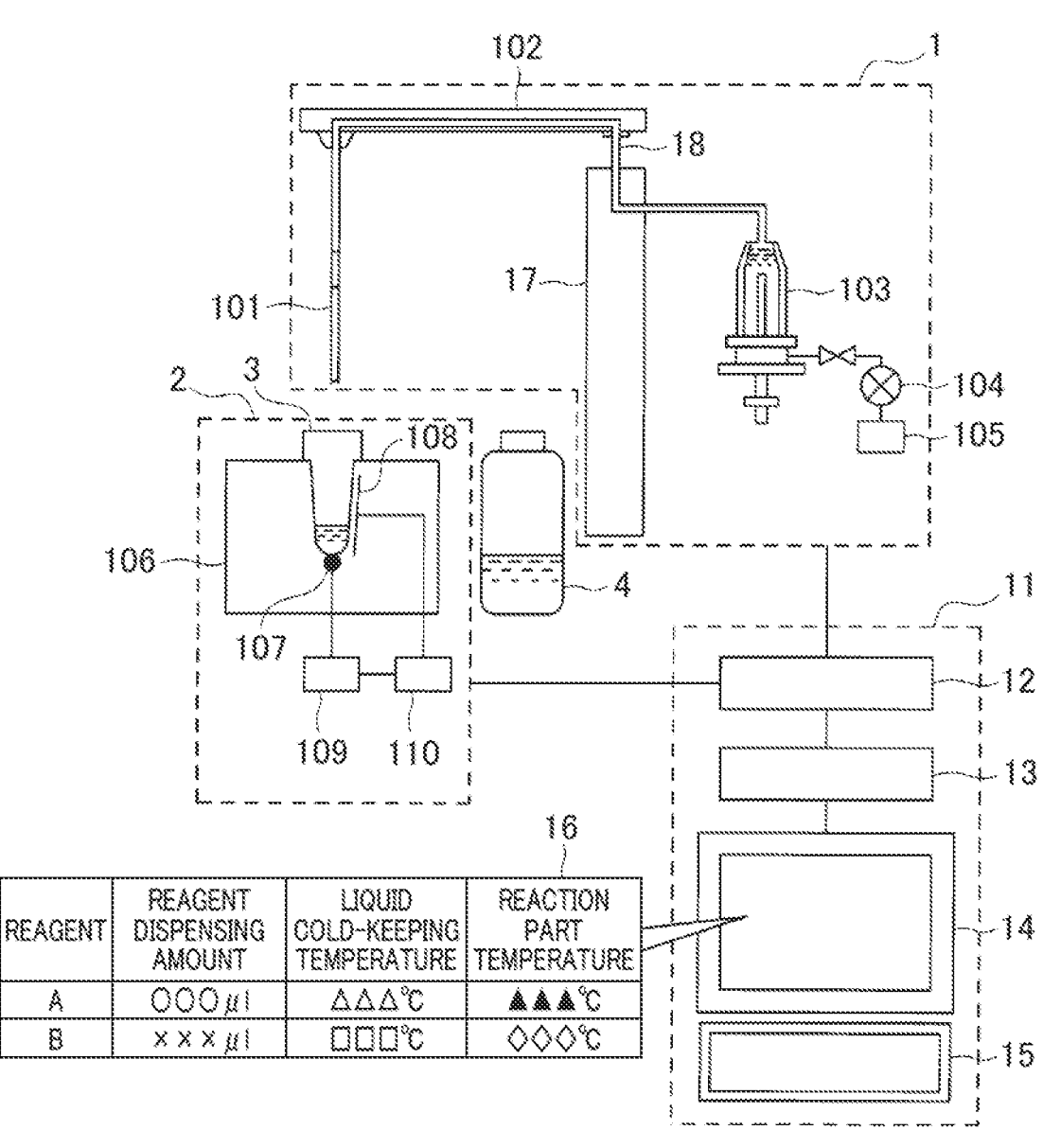
FIG. 1 is a schematic view of a configuration of a liquid dispensing device as a first embodiment of the invention.

FIG. 1 is a schematic view of a configuration of a liquid dispensing device according to the invention. The liquid dispensing device of this embodiment is assumed to be used in an automated analyzer such as an immunoassay device, for example. Description is now given on an exemplary case where a reagent is dispensed as a liquid to be dispensed.

The liquid dispensing device of this embodiment includes a liquid aspiration/discharge unit (liquid aspiration/discharge unit) 1, a reaction unit 2, a reaction container 3, and a reagent container 4. The liquid aspiration/discharge unit 1 and the reaction unit 2 are each connected to a computer 11. A sample container containing a liquid sample is disposed in an undepicted portion.

The liquid aspiration/discharge unit 1 is configured of a support 17, a reagent channel 18, a probe 101, an arm 102, a syringe pump 103, an electromagnetic valve 104, and a feed pump 105. In an aspiration operation using the syringe pump 103, a piston configuring the syringe pump 103 is drawn to the outside of the syringe pump 103, thereby the reagent (drug solution) in the reagent container 4 is aspirated into the reagent channel 18. In a discharge operation using the syringe pump 103, the piston is pushed into the inside of the syringe pump 103, thereby the reagent (drug solution) is discharged to the inside (dispensing position) of the reaction container 3 configuring the reaction unit 2. In this application, such an operation of aspirating the liquid in the reagent container 4 and discharging the liquid into the reaction container 3 is referred to as dispensation.

One end of the reagent channel 18 is connected to the syringe pump 103, and the other end has a probe (sample probe) 101 serving as both a discharge port and an aspiration port. Although the arm 102 is separated from the support 17 in FIG. 1, a top of the support 17 is connected to a bottom of the arm 102. Part of the reagent channel 18 is fixed to the arm 102, and the probe 101 is located directly under an end of the arm 102 on a side opposite to the support 17 side. For example, the columnar support (post) 17 rotates around an axis, thereby the arm 102 and the probe 101 rotates around the axis. The support 17 moves up and down, and thus the arm 102 and the probe 101 each also move up and down. Such rotation operation and up-and-down moving operation allow a lower end of the probe 102 to be immersed in the reagent in the reagent container 4, allow aspiration using the probe 101, and allow discharge of the reagent to the reaction position by the probe 101 moved to directly above the reaction container 3.

The syringe pump 103 is connected, via the electromagnetic valve 104, to the feed pump 105 for supplying washing water to wash the inside of the reagent channel 18, the inside of the syringe pump 103, and the inside of the probe 101.

The reaction unit 2 is configured of a constant temperature block 106, a temperature sensor 107, a heater 108, a temperature monitor part 109, and a temperature controller 110. The reaction container 3 is provided in the inside of a concave portion in the top of the constant temperature block 106. Metal having a high heat conductivity such as aluminum (Al) is used as a material of the constant temperature block 106, the temperature of which is controlled at a constant temperature of around 37° C. The heater 108 is disposed along a side surface of the reaction container 3. The constant temperature block 106 controlled in temperature and the heater 108 are used to control respective temperatures of the reaction container 3 and the inside (dispensing position) of the reaction container 3 to be suitable for a chemical reaction of the sample with the reagent. Heat generation of the heater 108 is controlled with a pulse wave having a constant current value. The reaction container 3 is disposal and used to mix the sample and the reagent for a reaction of them within the container. Herein, the inside of the reaction container 3, to which the liquid (sample or reagent) discharged from the probe 101 is poured, is referred to as dispensing position.

The temperature sensor 107 is disposed directly under a position at which the reaction container 3 is provided in the constant temperature block 106. The temperature sensor 107 is disposed so as to be in contact with the bottom of the reaction container 3 while the reaction container 3 is provided in the constant temperature block 106. The temperature sensor 107 is provided to monitor the temperature of the liquid (sample, reagent, or mixed solution thereof) in the reaction container 3, i.e., to monitor the temperature of the dispensing position. Hence, the temperature sensor 107 is disposed directly under the dispensing position. In other words, the temperature sensor 107 is disposed directly under a position, to which a liquid (for example, a reagent) is dropped, in the reaction container 3.

The temperature monitor part 109, which is connected to the temperature sensor 107 and to the temperature controller 110, is a mechanism that performs calculation, storage, or display of the temperature of the dispensing position detected using the temperature sensor 107, for example. The temperature controller 110, which is connected to the temperature monitor part 109 and to the heater 108, is a mechanism that regulates the temperature of the heater 108 and the temperature of the constant temperature block 106 and thus maintains the temperature of the reaction container 3 at a predetermined temperature.

The reagent container 4 is kept in a cool box (not shown) for a period (for example, several days to several weeks) during which the reagent in the container is used. The internal temperature in the cool box is maintained at 10° C. or lower, for example, about 4 to 10° C. In other words, the reagent container 4 is maintained at 10° C. or lower during dispensation. As described above, the temperature of the liquid in the reagent container 4 is lower than the temperature of the dispensing position controlled by the temperature controller 110.

The computer 11 is configured of a control part 12, a storage part 13, a display part 14, and an input part 15. The control part 12 is connected to the reaction unit 2, specifically connected to the temperature monitor part 109 and to the temperature controller 110. The control part 12 controls the temperature adjustment function of the temperature controller 110. Specifically, the control part 12 performs ON/OFF switching of such a temperature adjustment function, for example. Further, the control part 12 sends to the storage part 13 temperature information sent from the temperature monitor part 109, and sends to the storage part 13 length of ON time and length of OFF time of a pulse wave that is applied by the temperature controller 110 to the heater 108 to regulate heat generation of the heater 108. Such temperature information and time information are stored in the storage part 13 connected to the control part 12, and displayed by the display part 14 connected to the storage part 13.

The control part 12 is connected to the liquid aspiration/discharge unit 1, and controls the rotation operation and up-and-down moving operation of the arm 102, vertical operation of the syringe pump 103 for pressure feed or aspiration, opening and closing of the electromagnetic valve 104, and operation of the feed pump 105. In other words, the control part 12 controls the amount of dispensation. Such amount of dispensation is set via the control part 12 based on the information received from the input part 15. The control part 12 sends to the storage part 13 information such as an operation speed pattern and an operation amount of the liquid aspiration/discharge unit 1. Further, the control part 12 controls the cold keeping temperature of the liquid in the reagent container 4. The cold keeping temperature is set via the control part 12 based on the information received from the input part 15.

The storage part 13 is connected to the respective parts, i.e., the control part 12, the display part 14, and the input part 15. The storage part 13 stores the operation speed pattern and the operation amount of the liquid aspiration/discharge unit 1, and stores a target value of the temperature of the dispensing position controlled by the temperature controller 110. The storage part 13 further stores a parameter required for device control, such as an abnormal determination threshold as described later, in a form of a table.

The display part 14 is connected to the storage part 13, and displays on its screen a state of the liquid dispensing device, an alarm, or information received from the input part 15. FIG. 1 shows an exemplary image 16 displayed by the display part 14. As shown in the image 16, the state of the liquid dispensing device includes, for example, reagent information (reagent name), reagent dispensing amount, liquid cold-keeping temperature, and reaction temperature. The reagent dispensing amount means a setting value of the amount of the liquid (for example, reagent) discharged into the reaction container 3 using the liquid aspiration/discharge unit 1. The liquid cold-keeping temperature means the temperature of the reagent container 4 kept cold. The reaction temperature means the temperature of the reaction position measured by the temperature sensor 107 and the temperature monitor part 109. The alarm means display to inform of abnormality occurring in the liquid dispensing device.

The information received from the input part 15 includes, for example, reagent information (reagent name), reagent dispensing amount, liquid cold-keeping temperature, and reaction temperature. Specifically, the input part 15 is a mechanism connected to the display part 14 via, for example, the storage part 13, and sending the information required for operation of the liquid dispensing device to the storage part 13. The information includes, for example, reagent information (reagent name), reagent dispensing amount, liquid cold-keeping temperature, and reaction temperature. That is, the reagent information (reagent name) displayed by the display part 14 is sent from the input part 15. The reagent dispensing amount, the liquid cold-keeping temperature, and the reaction temperature displayed by the display part 14 can each be set to a value received from the input part 15. The display part may collectively display the reagent dispensing amount, the liquid cold-keeping temperature, and the reaction temperature as target values set based on the values received from the input part 15 and actually measured values of the liquid cold-keeping temperature and the reaction temperature together.

Operation of Liquid Dispensing Device

Operation of the liquid dispensing device of this embodiment is now described with reference to FIG. 1. The liquid dispensing device aims to dispense a sample (for example, serum) and a reagent, which are each a liquid, from different containers into one reaction container and thus mixes the liquids together to react the sample with the reagent.

In operation start, a reaction container transport mechanism (not shown) transports the reaction container 3 from a reaction container keeping position (not shown) to a reaction position on the constant temperature block 106. The constant temperature block 106 is kept at 37° C. Subsequently, while not shown, a liquid aspiration/discharge unit for a sample is used to aspirate a sample in the sample container and discharge the sample into the reaction container 3. Subsequently, washing water supplied from the feed pump 105 is used to wash the inside of the syringe pump 103 and the inside of the reagent channel 18.

Subsequently, the arm 102, which moves between a reagent aspiration position and a discharge position on the reaction container, is moved in a horizontal direction. When the arm 101 is moved to the reagent aspiration position, the support 17, the arm 102, and the probe 101 are moved down so that the probe 101 is inserted into the reagent container 4, and then the reagent in the reagent container 4 is aspirated by operation of the syringe pump 103. During this operation, the reagent container 4 is kept in a cool box maintained at 10° C. or lower.

Subsequently, the arm 102 moves up and pulls up the probe 101 to above the reagent container 4, and then the arm 102 moves in a horizontal direction to the discharge position on the reaction container while the reagent is kept in the probe 101. Subsequently, the arm 102 moves down at the discharge position on the reaction container and stops so that the end of the probe 101 stops at the top position of the reaction container 3, and then the reagent is discharged into the reaction container 3 by operation of the syringe pump 103.

The temperature monitor part 109 acquires from the temperature sensor 107 temperature data for a certain time before the reagent is discharged into the reaction container 3, and calculates the average temperature of the temperature data. The temperature controller 110 temporarily halts temperature control of the constant temperature block 106 and of the heater 108 immediately before start of discharge of the reagent into the reaction container 3, and the temperature monitor part 109 monitors the temperature during discharge of the reagent into the reaction container 3 with the temperature sensor 107. The temperature controller 110 restarts temperature control of the constant temperature block 106 and of the heater 108 immediately after the reagent discharge has been completed. In other words, the temperature control function by the temperature controller 110 is halted during dispensation (discharge).

The temperature monitor part 109 extracts the minimum value (minimum temperature) from among the temperature data during the reagent discharge time output from the temperature sensor 107. When the minimum value of the temperature data, i.e., the minimum temperature of the dispensing position is out of the predetermined threshold range, abnormality is determined to occur in liquid discharge. Specifically, if the temperature change amount of the dispensing position deviates from the predetermined threshold range after the liquid aspiration/discharge unit 1 starts discharge of the liquid into the reaction container 3, dispensation is determined to be abnormal. For example, in a case of the threshold range of 34° C. or lower, if the minimum temperature of the dispensing position is 34.5° C. during reagent discharge, dispensation is determined to be abnormal, but if such minimum temperature is 33.5° C., dispensation is determined to be normal.

Although it has been described that presence of abnormal dispensation is determined based on whether or not the minimum temperature of the dispensing position is within the predetermined threshold range, presence of abnormal dispensation may be determined based on whether or not a difference between the average temperature before reagent discharge and the minimum temperature is out of a predetermined threshold range. In such a case, when the threshold range is set to, for example, 3° C. or lower, and when the difference between the average temperature (for example, 37° C.) and the minimum temperature of the dispensing position is, for example, 2.5° C., dispensation is determined to be abnormal.

Before calculation of the average of the temperature data of the dispensing position before reagent discharge and before extraction of the minimum value of the temperature data during discharge, the respective temperature data may be subjected to smoothing processing, for example, temporal moving average may be obtained for the temperature data. Although the sample is dispensed before dispensing the reagent in this exemplary case, such order may be reversed. FIG. 1 shows a bubble existing between the reagent in the probe 101 and a liquid (for example, water) in the reagent channel 18 extending from the inside of the syringe pump 103 to a probe 101 side. Such a bubble existing in the reagent channel 18 makes it possible to separate the reagent from the liquid (for example, water) and prevent the reagent from being excessively discharged.

Effects of this Embodiment

In a sample test such as a biochemical test or an immune serum test performed using the liquid dispensing device, serum or plasma is often used as a sample, and when such a sample is left for a long time from extraction to the test, a clot such as fibrin is generated in the sample. If such a sample is directly flown in the liquid dispensing device, the clot may clog in a probe. If the probe is thus clogged, a predetermined amount of sample cannot be dispensed into the reaction container, and thus an accurate analysis result cannot be obtained. This means that analysis reliability of the automated analyzer using the liquid dispensing device is severely impaired. Such a problem may occur not only in sample dispensation but also in reagent dispensation.

As described above, the liquid dispensing device may experience abnormal dispensation caused by clogging in the liquid channel, i.e., shortage of the liquid discharged into the reaction container in dispensation. Abnormality other than such abnormality may include, for example, an excessive discharge amount of the reagent into the reaction container due to abnormal operation of the syringe pump.

In this embodiment, therefore, it is possible to detect occurrence of such abnormality by detecting a variation in temperature change amount of the dispensing position due to an abnormal dispensing amount. Specifically, when the dispensing amount becomes smaller than the determined amount due to occurrence of clogging in, for example, the probe 101 as shown in FIG. 1, an insufficient amount of reagent, which has been kept cool at 10° C. or lower, is supplied into the reaction container 3. Accordingly, the temperature of the reaction position is less reduced by dispensation, making it possible to detect abnormal dispensation. Conversely, when an excessive amount of reagent is supplied into the reaction container 3 due to abnormality in the syringe pump 103, the temperature of the reaction position is more reduced, making it possible to detect abnormal dispensation.

Figure 2:
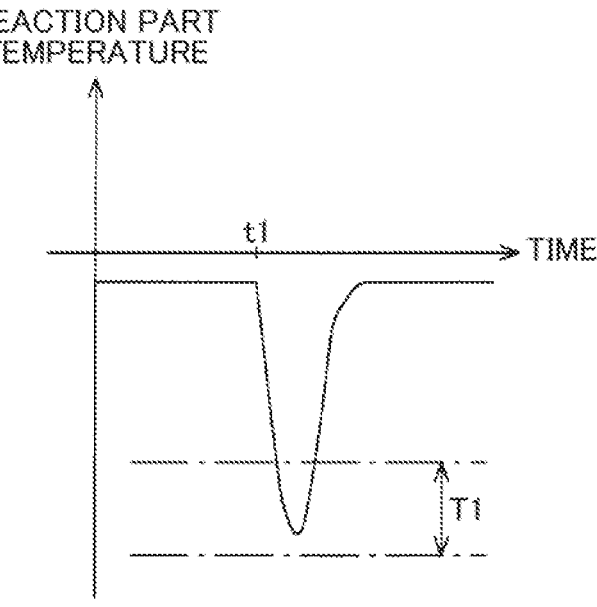
FIG. 2 illustrates a temporal change in temperature of a reaction part.

In this embodiment, therefore, an upper limit and/or a lower limit is beforehand set as an abnormality determination threshold (minimum temperature threshold) for the temperature change amount of the reaction position that lowers along with dispensation. The temperature of the dispensing position varies between before and after the dispensation operation as in the graph shown in FIG. 2, for example. In the graph of FIG. 2, the horizontal axis indicates time, and the vertical axis indicates the temperature of the reaction part (dispensing position). As shown in FIG. 2, while the temperature of the dispensing position is constant before dispensation start time t1, that the temperature rapidly lowers from immediately after the dispensation start time t1, and then rises again to have a certain value. At this time, if dispensation is normally performed, the minimum value of the relevant temperature falls within the range T1 (for example, 33 to 35° C.) between the two dashed lines as shown in FIG. 2. The temperature range T1 is a temperature range in which dispensation is determined to be normally performed, and the upper limit and the lower limit of the range T1 each correspond to the abnormality determination threshold. Hence, when the temperature of the dispensing position is higher or lower than the range T1, abnormal dispensation is determined to occur, and an alarm is displayed by the display part 14 as shown in FIG. 1.

Figure 3:
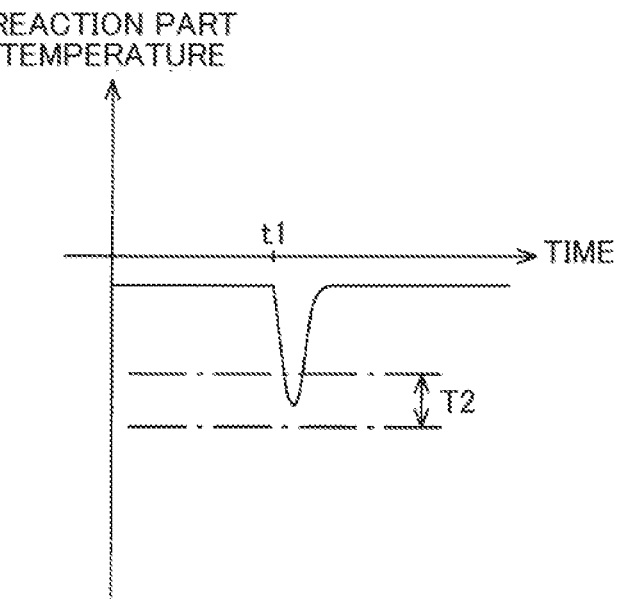
FIG. 3 illustrates a temporal change in temperature of the reaction part.

In a case of a smaller dispensing amount, the temperature of the dispensing position is less changed by dispensation than in the graph of FIG. 2. FIG. 3 shows a graph of temporal change in temperature of the dispensing position in a case of a small dispensing amount. In such a case, since the temperature change amount of the dispensing position is relatively small, a range T2 (for example, 35.5 to 36.5° C.) as a temperature range in which dispensation is determined to be normally performed is smaller than the range T1 (see FIG. 2) for the relatively large dispensing amount.

A table of FIG. 4 shows specific figures of determination time and a minimum temperature threshold, which are each beforehand determined depending on a reagent type, reagent cold-keeping setting temperature, reaction part setting temperature, and respective dispensing amounts. The determination time shown in FIG. 4 is time from dispensation start to end of detection of the minimum temperature of the dispensing position. If the minimum temperature of the dispensing position deviates from the minimum temperature threshold, abnormal dispensation is determined to occur. As shown in FIG. 4, the determination time and the range of the minimum temperature threshold are each reduced with a reduction in dispensing amount. Thus, if the dispensing amount is excessively small, the range of the minimum temperature threshold is excessively reduced, making it difficult to accurately detect occurrence of abnormal dispensation. In the device that monitors the temperature change amount to find abnormal dispensation as in this embodiment, therefore, the dispensing amount is desirably 50 μl or more in light of securing reliability of determination of abnormality occurrence.

The storage part 13 shown in FIG. 1 stores a plurality of determination periods and a plurality of minimum temperature thresholds that are beforehand determined depending on the reagent type, the reagent cold-keeping setting temperature, the reaction part setting temperature, and the respective dispensing amounts as shown in FIG. 4. The storage part 13 determines (selects) the determination time and the minimum temperature threshold depending on the reagent type, the reagent temperature, and the temperature of the reaction position, for example. Specifically, in this embodiment, the control part 12 sets the cold-keeping temperature of the liquid in the reagent container 4 and the dispensing amount. The storage part 13 automatically selects the optimal minimum temperature threshold from among the plurality of minimum temperature thresholds beforehand stored in the storage part 13 according to the information received from the input part 15, and monitors a dispensing state.

The information of the table of FIG. 4 can be displayed on a screen of the display part 14. That is, the reagent type, the reagent cold-keeping setting temperature, the reaction part setting temperature, and the dispensing amount can be input using the input part 15. Accordingly, corresponding determination time and a corresponding minimum temperature threshold are read from the storage part 13 and displayed on the screen of the display part 14. In addition, the determination time and the minimum temperature threshold can be received from the input part 15 in correspondence to a device condition. Consequently, respective numerical values of the determination time and the minimum temperature threshold can be changed from values beforehand stored in the storage part 13.

Although the reagent cold-keeping setting temperature and the reaction part setting temperature are each fixed in the table of FIG. 4, in a case of a significant difference between such temperatures, i.e., in a case of a significant difference in temperature between the reagent and the dispensing position, the temperature change amount of the dispensing position is larger during dispensation.

Specifically, a difference between the reagent temperature (reagent cold-keeping setting temperature) and the temperature (reaction part setting temperature) of the reaction position of 25° C. or more can improve reliability of determination on occurrence of abnormality. In this embodiment, the reagent cold-keeping setting temperature is 10° C. or lower, and the reaction part setting temperature set by the temperature controller 110 (see FIG. 1) is 35° C. or higher. That is, the temperature controller 110 controls the temperature of the dispensing position to be warm, 35° C. or higher.

If temperature measurement is tried by the temperature monitor part 109 while the temperature controller 110 (see FIG. 1) having high temperature control ability is operated, since the temperature of the dispensing position immediately returns to a certain value even if the temperature is temporarily lowered by dispensation, reduction in the temperature is difficult to be detected. In this embodiment, therefore, the temperature controller 110 temporarily halts temperature control of the constant temperature block 106 and the heater 108 immediately before start of dispensation of the reagent into the reaction container 3. The temperature monitor part 109 monitors the temperature during dispensation of the reagent into the reaction container 3, and the temperature controller 110 restarts temperature control of the constant temperature block 106 and the heater 108 immediately after completion of the discharge of the reagent. The temperature control is thus temporarily halted during dispensation operation, making it possible to easily detect the minimum value of a reduction in temperature of the dispensing position. Consequently, reliability of determination on occurrence of abnormal dispensation can be improved.

As described above, in this embodiment, the change amount of temperature of the dispensing position can be monitored to determine occurrence of abnormal dispensation, making it possible to improve reliability of the liquid dispensing device. Although description has been given on a case where a dispensation object is a reagent, since abnormal dispensation may also occur during dispensation of a sample, the liquid dispensing device of this embodiment may be used for dispensing the sample.

First Modification

Occurrence of abnormal dispensation may be determined using not only the temperature difference between before and during reagent discharge but also a derivative value of temperature change during reagent discharge time. In other words, a normal dispensation determination range may be provided for the minimum value of magnitude of the gradient of a graph indicating a temperature change of the dispensing position.

Figure 5:
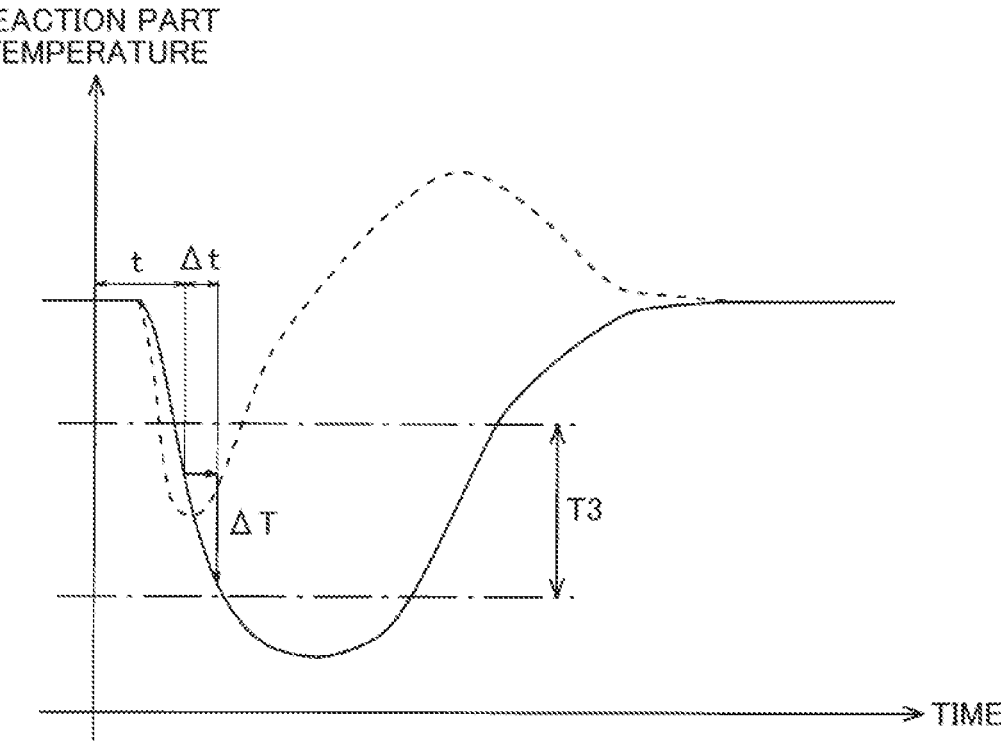
FIG. 5 illustrates temporal change in temperature and a time differential value of a temperature change amount of a reaction part.

FIG. 5 shows a graph of temperature of the dispensing position between before and after the dispensing operation. In the graph of FIG. 5, the horizontal axis indicates time, and the vertical axis indicates the temperature of the reaction part (dispensing position). FIG. 5 also shows by a broken line a graph ($\Delta T/\Delta t$ curve) of a derivative value $\Delta T/\Delta t$ of the temperature change amount $\Delta T$ at the dispensing position with respect to time $\Delta t$. In a case of normal dispensation, the minimum derivative value of the temperature change amount falls within a range T3 between two dashed lines shown in FIG. 5. The derivative value range T3 is a temperature range in which dispensation is determined to be normally performed, and the upper limit and the lower limit of the range T3 each correspond to the abnormality determination threshold. As described above, this modification uses time derivative of the temperature of the dispensing position for a certain time after start of discharge of the liquid into the reaction container 3 (see FIG. 1).

A table of FIG. 6 shows specific figures of determination time and a $\Delta T/\Delta t$ threshold, which are each beforehand determined depending on a reagent type, the reagent cold-keeping setting temperature, the reaction part setting temperature, and respective dispensing amounts. The $\Delta T/\Delta t$ threshold is a temperature range (range T3) in which dispensation is determined to be normally performed. Unlike FIG. 4, FIG. 6 shows an exemplary case where the reaction part setting temperature is 65° C. As shown in FIG. 6, the $\Delta T/\Delta t$ threshold is always constant regardless of the dispensing amount. However, if the dispensing amount is smaller, time for determination is shorter, and thus reliability of determination on presence of abnormality may be reduced. Consequently, the dispensing amount is desirably 50 µl or more in light of securing reliability of determination on abnormality occurrence.

The storage part 13 shown in FIG. 1 stores a plurality of determination periods and a plurality of $\Delta T/\Delta t$ thresholds that are beforehand determined depending on the reagent type, the reagent cold-keeping setting temperature, the reaction part setting temperature, and the respective dispensing amounts as shown in FIG. 6. The storage part 13 determines (selects) the determination time and the $\Delta T/\Delta t$ threshold depending on the reagent type, the reagent temperature, and the temperature of the reaction position, for example.

The information of the table of FIG. 6 can be displayed on the screen of the display part 14. That is, the reagent type, the reagent cold-keeping setting temperature, the reaction part setting temperature, and the dispensing amount can be input using the input part 15. Accordingly, corresponding determination time and a corresponding $\Delta T/\Delta t$ threshold are read from the storage part 13 and displayed on the screen of the display part 14. In addition, the determination time and the $\Delta T/\Delta t$ threshold can be received from the input part 15 in correspondence to a device condition. Consequently, respective numerical values of the determination time and the ΔT/Δt threshold can be changed from values beforehand stored in the storage part 13.

Second Modification

Occurrence of abnormal dispensation may be determined using a drive current that is flown by the temperature controller to return the temperature of the dispensing position reduced in temperature by reagent discharge to the original reaction-part setting temperature.

Specifically, abnormal dispensation may be determined using the drive current that is flown by the temperature controller 110 shown in FIG. 1 to control the heater 108. For example, when the heater 108 is controlled with a pulse wave having a constant current value, a temperature change can be detected by a ratio of ON time to OFF time of the pulse current.

When the temperature of the constant temperature block 106 is maintained constant at 37° C., the ratio of the ON time to the OFF time of the pulse current is also controlled while being kept constant. In contrast, when the temperature of the dispensing position and the temperature of the constant temperature block 106 are each lowered, the ratio of the ON time to the OFF time increases to increase each of the temperatures of the dispensing position and the constant temperature block 106 to 37° C.

In another example, the heater may be controlled with a change in drive current value. In such a case, a temperature change can be detected through time integration of the current value. When the temperature of the constant temperature block is maintained constant at 37° C., the constant temperature block 106 can be controlled at a constant temperature (37° C.) with a low drive current value. In contrast, when temperatures of the dispensing position and the constant temperature block 106 are each lowered, the drive current value increases to increase each of the temperatures of the dispensing position and the constant temperature block 106 to 37° C.

The temperature monitor part 109 records the ON/OFF time or the integration value of the pulse current for maintaining the temperature of the constant temperature block 106 to be constant. The temperature monitor part 109 uses the ratio of ON time to OFF time or the integration value after start of discharge of the liquid into the reaction container 3 to calculate a variation in energy consumption of the temperature controller 110.

A table of FIG. 7 shows specific figures of a determination temperature and an ON/OFF time ratio threshold, which are each beforehand determined depending on a reagent type, a reagent cold-keeping setting temperature, a reaction part setting temperature, and respective dispensing amounts. The determination temperature is temperature of the dispensing position and corresponds to temperature at which measurement (calculation) of the ON/OFF time ratio, which is started after start of dispensation, is finished. The ON/OFF time ratio threshold is a range of values, in which dispensation is determined to be normally performed, among values of the ratio of the ON time to the OFF time of the pulse current flown by the temperature controller 110 to control the heater 108. In this modification, if the energy consumption change amount of the temperature controller 110 deviates from the predetermined threshold (ON/OFF time ratio threshold) range after start of discharge of the liquid into the reaction container 3 by the liquid aspiration/discharge unit 1, dispensation is determined to be abnormal.

Unlike FIG. 4, FIG. 7 shows an exemplary case where the reagent cold-keeping setting temperature is 5° C. As shown in FIG. 7, the determination temperature is constant regardless of the dispensing amount. The determination temperature is basically the same as the reaction part setting temperature. If the dispensing amount is smaller, since the range of the ON/OFF time ratio threshold is also smaller, reliability of determination on presence of abnormality may be reduced. Consequently, the dispensing amount is desirably 50 μl or more in light of securing reliability of determination on abnormality occurrence.

The storage part 13 shown in FIG. 1 stores a plurality of determination temperatures and a plurality of ON/OFF time ratio thresholds that are beforehand determined depending on the reagent type, the reagent cold-keeping setting temperature, the reaction part setting temperature, and the respective dispensing amounts as shown in FIG. 7. The storage part 13 determines (selects) the determination temperature and the ON/OFF time ratio threshold depending on the reagent type, the reagent temperature, and the temperature of the reaction position, for example.

The information of the table of FIG. 7 can be displayed on the screen of the display part 14. Specifically, the reagent type, the reagent cold-keeping setting temperature, the reaction part setting temperature, and the dispensing amount can be input using the input part 15. Accordingly, corresponding determination time and a corresponding ON/OFF time ratio threshold are read from the storage part 13 and displayed on the screen of the display part 14. In addition, the determination time and the ON/OFF time ratio threshold can be received from the input part 15 in correspondence to a device condition. Consequently, respective numerical values of the determination time and the ON/OFF time ratio threshold can be changed from values beforehand stored in the storage part 13.

Second Embodiment

Figure 8:
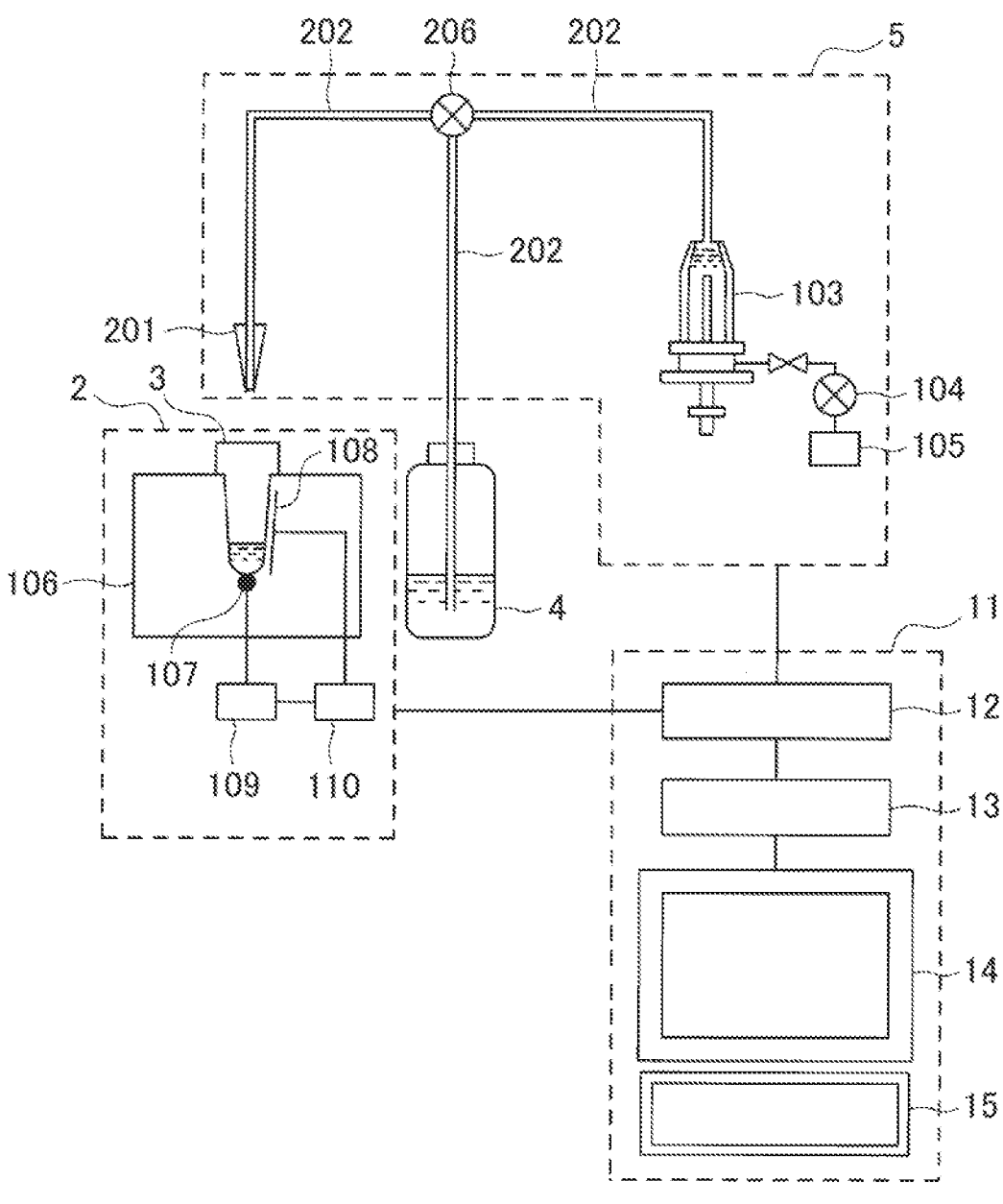
FIG. 8 is a schematic view of a configuration of a liquid dispensing device as a second embodiment of the invention.

FIG. 8 is a schematic view of a configuration of a liquid dispensing device of a second embodiment. The liquid dispensing device of this embodiment is assumed to be used in an immune assay device, for example. Description is now given on an exemplary case where a reagent is dispensed as a liquid to be dispensed. The liquid dispensing device is configured of a liquid discharge nozzle unit 5, a reaction unit 2, a reaction container 3, and a reagent container 4.

The liquid discharge nozzle unit 5 is configured of a nozzle 201, a reagent channel 202, a syringe pump 103, an electromagnetic valve 104, a feed pump 105, and a switching valve 206, where the nozzle 201 and the reagent container 4 are connected together via the reagent channel 202 having the switching valve 206 midway.

The syringe pump 103, the electromagnetic valve 104, and the feed pump 105 are each configured in the same way as in the first embodiment. In the reagent channel 202 extending in three directions from the switching valve 206, a first reagent channel 202 has the nozzle 201 at its end, a second reagent channel 202 has an end immersed in the liquid (reagent) in the reagent container 4, and a third reagent channel 202 has an end connected to the syringe pump 103. In other words, each of the reagent channels 202 extending from the nozzle 201, the syringe pump 103, and the reagent container 4 is connected to the switching valve 206. The reaction container 3 as a component of the reaction unit 2 is disposed directly below the nozzle 201.

Respective configurations of the reagent container 4 and the reaction unit 2 are the same as those in the first embodiment. The liquid dispensing device is connected to a computer 11. The computer 11 has the same configuration as in the first embodiment. Specifically, a control part 12 as a component of the computer 11 is connected to the reaction unit 2, further specifically, connected to the temperature monitor part 109 and to the temperature controller 110. The control part 12 is also connected to the liquid discharge nozzle unit 5, and performs, for example, operation of the switching valve 206, and further performs control of vertical operation of the syringe pump 103 for pressure feed or aspiration, control of opening and closing of the electromagnetic valve 104, and control of operation of the feed pump 105.

Operation of the liquid dispensing device of this embodiment is now described with reference to FIG. 2. Before start of operation of the liquid dispensing device, the inside of the reagent channel 202 between the syringe pump 103 and the switching valve 206 is filled with water, and the inside of the reagent channel 202 between the reagent container 4 and the switching valve 206 and the inside of the reagent channel 202 between the nozzle 201 and the switching valve 206 are each filled with the reagent.

In start of operation of the liquid dispensing device, a reaction container transport part (not shown) transports the reaction container 3 from a reaction container keeping position (not shown) to a reaction position on a constant temperature block 106. The constant temperature block 106 is kept at 37° C. Subsequently, a sample (not shown) is dispensed into the reaction container 3 using the liquid dispensing device. Operation performed for dispensing the sample is the same as the following operation for dispensing the reagent. Subsequently, the switching valve 206 is switched to an aspiration position. That is, the switching valve 206 is operated such that the reagent channel 202 on a syringe pump 103 side is conducted with the reagent channel 202 on a reagent container 4 side. Subsequently, the reagent in the reagent container 4 is aspirated into the reagent channel 202 by aspiration operation of the syringe pump 103. Subsequently, the switching valve 206 is switched to a reagent discharge position. That is, the switching valve 206 is operated such that the reagent channel 202 on a syringe pump 103 side is conducted with the reagent channel 202 on a nozzle 201 side. Subsequently, the reagent is discharged from the nozzle 201 into the reaction container 3 by discharge operation of the syringe pump 103.

The temperature monitor part 109 acquires from the temperature sensor 107 temperature data for a certain time before the reagent is discharged into the reaction container 3, and calculates the average temperature of the temperature data. The temperature controller 110 temporarily halts temperature control of the constant temperature block 106 and of the heater 108 immediately before start of discharge of the reagent into the reaction container 3. The temperature monitor part 109 monitors the temperature during discharge of the reagent into the reaction container 3 with the temperature sensor 107. The temperature controller 110 restarts temperature control of the constant temperature block 106 and of the heater 108 immediately after the reagent discharge has been completed.

The temperature monitor part 109 extracts the minimum value (minimum temperature) from among the temperature data during the reagent discharge time output from the temperature sensor 107. When the minimum value of the temperature data, i.e., the minimum temperature of the dispensing position is out of the beforehand determined threshold range, abnormality is determined to occur in liquid discharge. Specifically, if the temperature change amount of the dispensing position deviates from the beforehand determined threshold range after the liquid discharge nozzle unit 5 starts discharge of the liquid into the reaction container 3, dispensation is determined to be abnormal. For example, in a case of the threshold range of 34° C. or lower, if the minimum temperature of the dispensing position is 34.5° C. during reagent discharge, dispensation is determined to be abnormal, and if that minimum temperature is 33.5° C., dispensation is determined to be normal.

Although it has been described that presence of abnormal dispensation is determined based on whether or not the minimum temperature of the dispensing position is within the beforehand determined threshold range, presence of abnormal dispensation may be determined based on whether or not a difference between the average temperature before reagent discharge and the minimum temperature is out of a beforehand determined threshold range. In such a case, when the threshold range is set to, for example, 3° C. or lower, and when the difference between the average temperature (for example, 37° C.) and the minimum temperature of the dispensing position is, for example, 2.5° C., dispensation is determined to be abnormal.

Before calculation of the average of the temperature data of the dispensing position before reagent discharge and before extraction of the minimum value from among the temperature data during discharge, the respective temperature data may be subjected to smoothing processing, for example, temporal moving average may be obtained for the temperature data. Although the sample is dispensed before dispensing the reagent in this exemplary case, such order may be reversed.

The control part 12, the storage part 13, and the display part 14 each operate in the same way as in the first embodiment, and the input part 15 is used in the same way as in the first embodiment.

The configuration and operation of the liquid dispensing device of this embodiment are the same as those of the first embodiment except that the reagent channel 202 is fixed and switched with the switching valve 206 at aspiration or discharge of the reagent. Consequently, this embodiment can provide the same effects as in the first embodiment.

Third Embodiment

Figure 9:
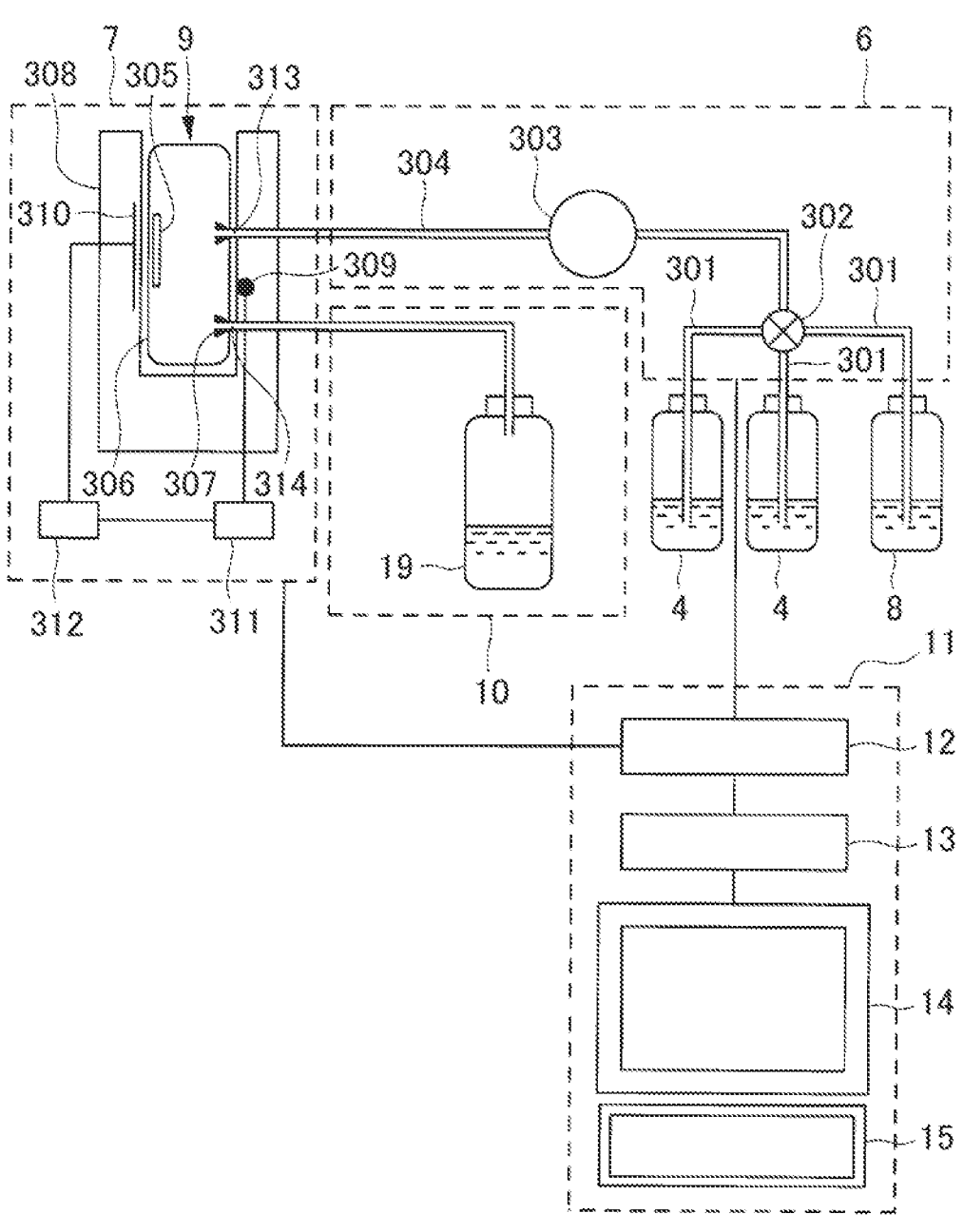
FIG. 9 is a schematic view of a configuration of a liquid dispensing device as a third embodiment of the invention.

FIG. 9 is a schematic view of a configuration of a liquid dispensing device of a third embodiment of the invention. The liquid dispensing device of this embodiment is assumed to be used in a hybridization device for a DNA chip, for example. Description is now given on an exemplary case where a reagent and a sample are each dispensed as a liquid to be dispensed.

The liquid dispensing device of this embodiment is configured of a liquid dispensing unit 6, a reaction unit 7, a reagent container 4, a sample container 8, a DNA chip cartridge 9, and a waste fluid unit 10. The liquid dispensing unit 6 is configured of a liquid aspiration nozzle 301, a switching valve 302, a liquid feed pump 303, and a channel 304. The DNA chip cartridge 9 is configured of a DNA chip 305, a cartridge (reaction container) 306, and a septum (pipe socket having a seal function) 307. The reaction unit 7 is configured of a constant temperature block 308, a temperature sensor 309, a heater 310, a temperature monitor part 311, and a temperature controller 312. A liquid inlet 313 is connected to the liquid dispensing unit 6, and a liquid outlet 314 is connected to the waste fluid unit 10. The DNA chip cartridge 9 is provided in the reaction unit 7. The DNA chip cartridge 9 can be removed to the outside of the reaction unit 7.

In the liquid dispensing unit 6, each of the three liquid aspiration nozzles 301 is connected to the switching valve 302, and the switching valve 302 is connected to the channel 304 having the liquid feed pump 303 midway. Between ends of the channel 304, one end of the channel 304 on a side opposite to the switching valve 302 is connected to the liquid inlet 313 of a cartridge 306 as a component of the DNA chip cartridge 9. Among the three liquid aspiration nozzles 301, some of the liquid inlet 313 extends into the reagent container 4 in an insertional manner, and another some of the liquid inlet 313 extends into the sample container 8 in an insertional manner.

Metal having a high heat conductivity such as aluminum is used as a material of the constant temperature block 308, and temperature of the constant temperature block 308 is controlled at a constant temperature appropriately selected from within a range from 20 to 95° C. The temperature sensor 309 is disposed so as to be in contact with a side surface of the DNA chip cartridge 9 provided at a reaction position within the constant temperature block 308. A dispensing position herein is a place surrounded by the constant temperature block 308, i.e., a place at which the DNA chip cartridge 9 is placed in FIG. 9. Herein, the temperature of the dispensing position means the temperature of a liquid in the DNA chip cartridge 9. The heater 310 connected to the temperature controller 312 is disposed along a side surface of the DNA chip cartridge 9. The reagent container 4 and the sample container 8 are placed under room temperature for a period where the reagent and the sample in the respective containers are used. Herein, the room temperature is 15 to 32° C., for example. The DNA chip 305 is disposed in the cartridge 306.

The waste fluid unit 10 is configured of a waste fluid container 19. A channel extends from the liquid outlet of the cartridge 306 into the container 19 in an insertional manner.

The liquid dispensing device is connected to a computer 11. The computer 11 has the same configuration as in the first embodiment. Specifically, a control part 12 as a component of the computer 11 is connected to the reaction unit 7, further specifically, connected to the temperature monitor part 311 and to the temperature controller 312. The control part 12 is also connected to the liquid dispensing unit 6 to operate, for example, the switching valve 302 and control operation of the feed pump 303, for example.

Operation of the liquid dispensing device of this embodiment is now described with reference to FIG. 9. In start of operation, the DNA chip cartridge 9 is transported by a cartridge transport part (not shown) from a cartridge keeping position (not shown) to a reaction position within the constant temperature block 308 and placed at the reaction position. The DNA chip cartridge 9 is fixed at the reaction position by a holding part (not shown). The constant temperature block 308 is kept at 65° C. Subsequently, the switching valve 302 is switched such that the liquid aspiration nozzle 301 immersed in the reagent is connected to the channel 304. Subsequently, the reagent is fed using the liquid feed pump 303 and discharged into the DNA chip cartridge 9 via the septum 307.

The temperature monitor part 311 acquires from the temperature sensor 309 temperature data of the dispensing position for a certain time before the reagent is discharged into the DNA chip cartridge 9, and calculates the average temperature of the temperature data. The temperature controller 312 temporarily halts temperature control of the constant temperature block 308 immediately before start of discharge of the reagent into the DNA chip cartridge 9. The temperature monitor part 311 monitors, with the temperature sensor 309, the temperature of the dispensing position during discharge of the reagent into the DNA chip cartridge 9. The temperature controller 312 restarts temperature control immediately after the reagent discharge has been completed. The temperature monitor part 311 extracts the minimum value (minimum temperature) from among the temperature data during the reagent discharge output from the temperature sensor 309, and when a difference between the minimum value and the above average temperature before reagent discharge is out of a beforehand determined threshold range, determines that abnormality occurs in liquid discharge. For example, in a case of the threshold range of 63 to 64° C., if the minimum temperature of the dispensing position is 64.5° C. during reagent discharge, dispensation is determined to be abnormal, if that minimum temperature is 63.5° C., dispensation is determined to be normal, and if the minimum temperature is 62.5° C., dispensation is determined to be abnormal.

The control part 12, the storage part 13, and the display part 14 each operate in the same way as in the first embodiment, and the input part 15 is used in the same way as in the first embodiment.

The configuration and operation of the liquid dispensing device of this embodiment are the same as those of the first embodiment except in a structure of the reaction unit 7, and except that the reagent channel 304 is fixed, the reagent and the sample are changed from each other by the switching valve 302 during aspiration, and the waste fluid unit 10 is provided.

As described above, in this embodiment, it is possible to monitor the temperature change amount of the dispensing position and determine occurrence of abnormal dispensation. The abnormal dispensation herein refers to a reduction in dispensing amount due to, for example, clogging occurring within the channel 304, or an excessive discharge amount of the reagent into the DNA chip cartridge 9 due to abnormal operation of the liquid feed pump 303, for example. Consequently, this embodiment can improve reliability of the liquid dispensing device.

Herein, although the reagent container 4 and the sample container 8 are kept at room temperature, the DNA chip cartridge 9 is kept at a temperature (for example, 65° C.) higher than room temperature. Hence, when a reagent supply amount is smaller than a predetermined amount, the temperature of the dispensing position is less reduced, and thus occurrence of abnormal dispensation can be detected. Specifically, since a difference between each of temperatures of the reagent container 4 and the sample container 8 and the temperature of the dispensing position is 25° C. or more, occurrence of abnormal dispensation can be accurately detected. Although a case of reagent dispensation has been described hereinbefore, since abnormal dispensation may also occur during sample dispensation, the liquid dispensing device of this embodiment may be used for sample dispensation.

Although the invention achieved by the inventors has been specifically described according to some embodiments, the invention should not be limited thereto, and various modifications or alterations can be made within the scope without departing from the gist of the invention.

INDUSTRIAL APPLICABILITY

The invention can be widely used for a liquid dispensing device used for extracting a sample, a reagent, or a reaction solution of a reagent and a reaction.

LIST OF REFERENCE SIGNS

1 Liquid aspiration/discharge unit
2, 7 Reaction unit
3 Reaction container
4 Reagent container
5 Liquid discharge nozzle unit
6 Liquid dispensing unit
8 Sample container
9 DNA chip cartridge
10 Waste fluid unit
11 Computer
12 Control part
13 Storage part
14 Display part
15 Input part
16 Image
17 Support
18, 202 Reagent channel
19 Container
101 Probe
102 Arm
103 Syringe pump
104 Electromagnetic valve
105 Feed pump
106, 308 Constant temperature block
107, 309 Temperature sensor
108, 310 Heater
109, 311 Temperature monitor part
110, 312 Temperature controller
201 Nozzle
206, 302 Switching valve
301 Liquid aspiration nozzle
303 Liquid feed pump
304 Channel
305 DNA chip
306 Cartridge
307 Septum
313 Liquid inlet
314 liquid outlet

The invention claimed is:

1. A liquid dispensing device, comprising:
a container for storing a liquid;
a liquid aspiration/discharge part that aspirates the liquid in the container and discharges the liquid into a dispensing position inside of a reaction vessel, wherein the dispensing position is an inside space of the reaction vessel to which the liquid discharge from the liquid aspiration/discharge part is poured and thus performs dispensation;
a temperature controller that controls a temperature of the dispensing position in the reaction vessel; and a temperature monitor part that monitors the temperature of the dispensing position in the reaction vessel, wherein the device is configured to determine that dispensation is abnormal in response to a change amount of a temperature of the dispensing position deviating from a beforehand determined threshold range after the liquid aspiration/discharge part starts discharging of the liquid to the dispensing position;

a control part connected to the liquid aspiration/discharge part and to a reaction unit including the temperature controller and the temperature monitor part;
a storage part connected to the control part; and
a display part and an input part each connected to the storage part, wherein the control part sets a cold-keeping temperature of the liquid in the container and an amount of the dispensation, and
automatically selects an optimal temperature threshold from among a plurality of temperature thresholds beforehand stored in the storage part according to information received from the input part.

2. The liquid dispensing device according to claim 1, wherein the device is configured to maintain a temperature of the liquid in the container lower than the temperature of the dispensing position controlled by the temperature controller.

3. The liquid dispensing device according to claim 2, wherein the device is configured to maintain the temperature of the liquid in the container at 10° C. or lower.

4. The liquid dispensing device according to claim 2, wherein the temperature controller is configured to control the temperature of the dispensing position to be warm, 35° C., or higher.

5. The liquid dispensing device according to claim 2, wherein the device is configured to maintain a difference between the temperature of the liquid in the container and the temperature of the dispensing position controlled by the temperature controller at 25° C. or more.

6. The liquid dispensing device according to claim 1, wherein the device is configured to discharge the liquid to the dispensing position at an amount of 50 μl or more.

7. The liquid dispensing device according to claim 1, wherein the device is configured to halt temperature control before the liquid is discharged to the dispensing position, and restart the temperature control after the liquid has been discharged to the dispensing position.

8. The liquid dispensing device according to claim 1, wherein a temperature sensor as a component of the temperature monitor part is disposed directly below a position to which the liquid is dropped.

9. The liquid dispensing device according to claim 1, wherein the device is configured to use a difference between an average temperature of the dispensing position within a certain time before discharge of the liquid and a minimum temperature of the dispensing position after start of discharge of the liquid as the temperature change amount.

10. The liquid dispensing device according to claim 1, wherein the device is configured to use a time derivative of the temperature of the dispensing position for a certain time after start of discharge of the liquid as the temperature change amount.

11. A liquid dispensing device, comprising:
a container for storing a liquid;
a liquid aspiration/discharge part that discharges the liquid in the container into a dispensing position inside of a reaction vessel, wherein the dispensing position is an inside space of the reaction vessel to which the liquid discharge from the liquid aspiration/discharge part is poured;
a temperature controller that controls temperature of the dispensing position in the reaction vessel; and
a monitor part that monitors energy consumption of the temperature controller,
wherein the device is configured to determine that dispensation is abnormal in response to a change amount of energy consumption of the temperature controller deviating from a beforehand determined threshold range after the liquid aspiration/discharge part starts discharging of the liquid to the dispensing position.

12. The liquid dispensing device according to claim 11, wherein the monitor part records ON/OFF time of a control current pulse for the temperature control, and calculates the change amount of energy consumption of the temperature controller using a ratio of the ON/OFF time after start of discharge of the liquid to the dispensing position.

13. The liquid dispensing device according to claim 11, wherein the monitor part records a current value for the temperature control every certain time, and calculates the change amount of energy consumption of the temperature controller using an integrated value of the current value after start of discharge of the liquid to the dispensing position.

14. The liquid dispensing device according to claim 11, further comprising:

a control part connected to the liquid aspiration/discharge part and to a reaction unit including the temperature controller and the temperature monitor part;

a storage part connected to the control part; and a display part and an input part each connected to the storage part, wherein the control part sets a cold-keeping temperature of the liquid in the container and an amount of the dispensation, and automatically selects an optimal energy consumption threshold from among a plurality of energy consumption thresholds beforehand stored in the storage part according to information received from the input part.

* * * * *